Figure 1:
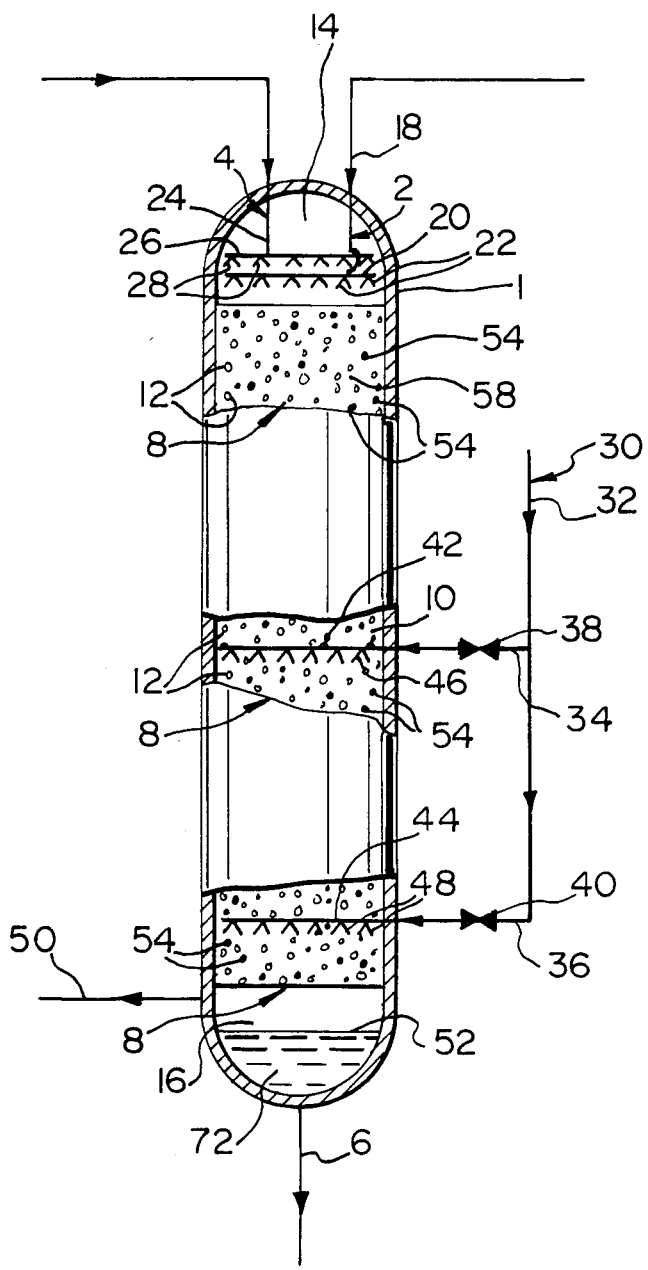

United States Patent [19]

Chuang et al.

[11] Patent Number: 4,552,744
[45] Date of Patent: Nov. 12, 1985

[54] PROCESS FOR THE PRODUCTION OF SULFURIC ACID USING COATED CATALYSTS

[75] Inventors: Karl T. Chuang; David R. P. Thatcher, both of Deep River, Canada

[73] Assignee: Atomic Energy of Canada Limited, Chalk River, Canada

[21] Appl. No.: 635,626

[22] Filed: Jul. 30, 1984

[30] Foreign Application Priority Data

Feb. 10, 1984 [CA] Canada ................................. 447230

[51] Int. Cl.[4] ..................... C01B 17/74; C01B 17/98; C01B 17/48
[52] U.S. Cl. .................................. 423/522; 423/536; 423/242; 422/161; 502/62
[58] Field of Search ............... 423/532, 533, 536, 522, 423/242 R; 422/160, 161; 502/62, 150

[56] References Cited

U.S. PATENT DOCUMENTS

| | | | |
|---|---|---|---|
| 2,885,368 | 5/1959 | Hess et al. ............................. | 502/62 |
| 3,836,630 | 9/1974 | Noguchi et al. ..................... | 423/522 |
| 3,965,210 | 6/1976 | Chu ...................................... | 502/62 |
| 4,045,353 | 8/1977 | Kosaka et al. ........................ | 502/62 |
| 4,070,441 | 1/1978 | Pessec ................................. | 423/522 |
| 4,139,596 | 2/1979 | Vaseen ................................ | 423/522 |
| 4,177,249 | 12/1979 | Stoddard et al. ................... | 423/522 |
| 4,186,171 | 1/1980 | Stoddard et al. ................... | 422/161 |
| 4,316,819 | 2/1982 | Tu et al. .............................. | 502/62 |
| 4,386,012 | 5/1983 | Kulprathipanja et al. ........... | 502/62 |
| 4,414,005 | 11/1983 | De Bievre et al. ................... | 502/62 |

FOREIGN PATENT DOCUMENTS

| | | | |
|---|---|---|---|
| 1200267 | 9/1965 | Fed. Rep. of Germany ...... | 423/522 |
| 51-20769 | 2/1976 | Japan .................................. | 423/522 |
| 51-70180 | 6/1976 | Japan .................................. | 423/522 |

*Primary Examiner*—Gary P. Straub
*Attorney, Agent, or Firm*—Francis W. Lemon

[57] ABSTRACT

A process is described for producing sulphuric acid from sulphur dioxide ($SO_2$) wherein two fluid streams, in the form of a gaseous $SO_2$ gas and oxygen (air), and a liquid, primary sulphuric acid and water, are contacted with each other and a catalyst assembly at a temperature in the range 150° to 280° C., the catalyst assembly comprising, for example, non-combustible, sulphuric acid resistant, porous ceramic supports with outer, porous membrane coatings on them of, say, polytetrafluorethylene, which is a process temperature and sulphuric acid resistant, water repellent, gaseous sulphur dioxide and oxygen gas permeable, high molecular, organic polymeric material, and platinum crystallites dispersed on the support in the polytetrafluorethylene so that:

(i) gaseous sulphur dioxide and oxygen are catalytically combined to form sulphur trioxide,
(ii) exothermic heat generated in the catalyst assembly by the formation of sulphur trioxide therein dissipated by the sulphuric acid and water,
(iii) the sulphur trioxide and the water combine to form secondary sulphuric acid, and
(iv) the primary sulphuric acid combines with the secondary sulphuric acid to form a relatively more concentrated sulphuric acid solution therewith which is collected.

7 Claims, 2 Drawing Figures

PROCESS FOR THE PRODUCTION OF SULFURIC ACID USING COATED CATALYSTS

This invention relates to a method of producing sulphuric acid ($H_2SO_4$) from sulphur dioxide ($SO_2$).

Numerous processes have been developed for $SO_2$ removal from flue gases and other sources of $SO_2$ emissions. Similarly, several processes have been developed for the production of sulphuric acid from $SO_2$ produced by sulphur combustion.

Typical flue gases contain $SO_2$ in the concentration range 1,000 to 5,000 ppm. Removal systems can be divided into two main categories:

(i) $SO_2$ recovery processes, such as catalytic reduction, catalytic oxidation, adsorption or absorption by solids or liquids, and (ii) so called "throwaway" wet and dry systems. Recovery processes usually involve the production of gypsum or sulphur.

Catalytic oxidation has been used for $SO_2$ removal, see for instance, the so called Monsanto Cat-Ox system, H. S. Rosenburg et al, Chemical Engineering Progress, Vol. 71, No. 5, 1975. This process involves separate oxidation and $SO_3$ absorption into $H_2SO_4$.

Existing sulphuric acid production processes involve gas phase catalytic oxidation at high temperature (400°–500° C.) over a vanadium type catalyst followed by absorption of $SO_3$ into concentrated sulphuric acid in an absorption tower. Original sulphuric plants used platinum (Pt) catalysts on asbestos supports. The feed gas is produced from sulphur combustion and is diluted to a 10% $SO_2$ in air mixture; the $SO_2$ feed concentration is limited by the high heat of reaction which could damage the catalyst. Existing catalytic reactors require dry gas feeds, and so a drying tower where the gas is contacted with 93% sulphuric acid is essential. Preheating of the feed gas to 450° C. is carried out in heat exchangers utilizing heat of reaction.

Usually, in existing processes, the catalyst bed is divided into four stages and the gas is cooled between stages to achieve high conversion efficiency. With a typical catalyst ignition temperature of 450° C., the maximum conversion without cooling would be approximately 60%, and so three cooling steps are required. Removal of $SO_3$ from the reactor also improves overall conversion efficiency, so in the so called "double absorption" system, gas is withdrawn between the 2nd and 3rd, or 3rd and 4th catalytic stages and is passed through absorption towers.

The so called Wellman-Lord $SO_2$ process, P. Leckner et al, Chemical Engineering Progress, February 1982, combines a $SO_2$ removal process with a sulphuric acid process. Basically the process involves three main stages:

(i) Flue gas clean up and absorption in sodium bisulphite, (ii) Regeneration of the $SO_2$ from crystallized bisulphite, (iii) Catalytic oxidation of $SO_2$ followed by absorption. While the process is efficient, it requires a large number of unit operations.

There is a need for a method and an apparatus for producing $H_2SO_4$ from $SO_2$ wherein, (1) the process is simple, one-step process suitable for the removal of $SO_2$ from air streams with simultaneous production of sulphuric acid therefrom.

(2) the $SO_2$ may arise from a variety of sources and in a wide concentration range from 10 ppm to 60% so that the same process may be used for controlling air pollution from flue gases as well as for H SO production, (3) it is not necessary to dry the feed gas because the catalyst is wet-proofed and the catalytic part of the process is two-phase, (4) the catalytic reactor operates at a temperature in the range 150°–280° C., so that the need for large gas preheaters is reduced. Typically, flue gases are in this temperature range and so, unlike conventional processes, only a small amount of preliminary heating may be required, and the heat of reaction is sufficient to maintain the reactor operating temperature, (5) lower catalyst temperatures result in interstage gas cooling not being required to maintain high conversion and efficient in situ cooling is provided by sulphuric acid trickling over the catalytic bed, (6) absorption of $SO_3$ takes place almost simultaneously in one vessel with the oxidation step and is very efficient so that there is, therefore, no need for interstage absorption towers.

(7) the oxidation and absorption are combined so that costly $H_2SO_4$ mist collectors usually required for conventional $SO_3$ absorption towers are eliminated, (8) in power plants, the initial cooling of flue gases from around 200° C. to ambient, for treatment in absorption towers, and then reheating before release to the stack, which results in an unnecessary 3 to 5% loss of plant energy, is avoided.

According to the present invention, there is provided a method of producing sulphuric acid from sulphur dioxide, comprising:

(a) simultaneously contacting fluid streams in the form of gaseous sulphur dioxide and oxygen and liquid primary sulphuric acid and water, and a catalyst assembly in the path of the contacting fluids, said fluid and said catalyst assembly being contacted at a process temperature in the range 150° to 280° C., the catalyst assembly comprising at least one high surface area, non-combustible, sulphuric acid resistant support and an outer, porous membrane coating on the said at least one catalyst support and consisting of a process temperature and sulphuric acid resistant, water repellent, gaseous sulphur dioxide and oxygen gas permeable, high molecular weight, organic, polymeric material and crystallites of at least one catalytically active metal selected from Group VIII of the Periodic Table, with the crystallites dispersed on the porous support in the polymeric material, so that:

(i) gaseous sulphur dioxide and oxygen are catalytically combined to form sulphur trioxide, (ii) exothermic heat generated in the catalyst packed bed assembly by the formation of sulphur trioxide is dissipated by sulphuric acid and water, (iii) the sulphur trioxide and the water combine to form secondary sulphuric acid, and (iv) the primary sulphuric acid combines with the secondary sulphuric acid to form a relatively more concentrated sulphuric acid solution therewith, and then (b) collecting the more concentrated sulphuric acid solution.

Further, according to the present invention, there is provided a sulphuric acid, from sulphur dioxide, producing apparatus, comprising:

(a) an upwardly extending casing having inlet means to an upper end thereof for fluid streams in the form of gaseous sulphur dioxide and oxygen, and liquid primary sulphuric acid and water, and outlet means from a lower end thereof for sulphuric acid, (b) a catalyst assembly in an intermediate portion of the casing for receiving the fluid streams thereacross from the inlet means, at a process temperature in the range of 150° to 280°, and catalytically combining the gaseous sulphur dioxide and oxygen into, and delivering sulphuric acid to the outlet means, the catalyst assembly comprising at least one high surface area, non-combustible, sulphuric acid resistant support and an outer, porous membrane coating on the said at least one support and consisting of a process temperature and sulphuric acid resistant, water repellent, gaseous sulphur dioxide and oxygen gas permeable, high molecular weight, organic, polymeric material and crystallites of at least one catalytically active metal selected from Group VIII of the Periodic Table, with the crystallites dispersed on the porous support in the polymeric material.

Preferably, the gaseous oxygen is supplied as a constituent of air.

The primary sulphuric acid may be in solution with the water. Preferably, the catalyst assembly is an upwardly extending catalyst packed bed, the gaseous sulphur dioxide and oxygen are distributed over the catalyst packed bed, and the liquid, primary sulphuric acid and water are distributed over the catalyst packed bed at a position above the gaseous sulphur dioxide and oxygen in order to entrain them and convey them downwardly through the catalyst packed bed.

Preferably, the said at least one catalyst support has a surface area in the range 50 to 250 m$^2$/g.

In some embodiments of the present invention, additional, primary sulphuric acid and water are distributed across the catalyst assembly at, at least, one intermediate level thereof.

Preferably, greater surface area contact between the sulphur trioxide and primary sulphuric acid and water is provided by the catalyst assembly including at least one catalytically inert packing structure interspersed with the said at least one catalyst support, with said at least one catalytically inert packing structure having an exterior which is substantially hydrophilic.

Figure 2:
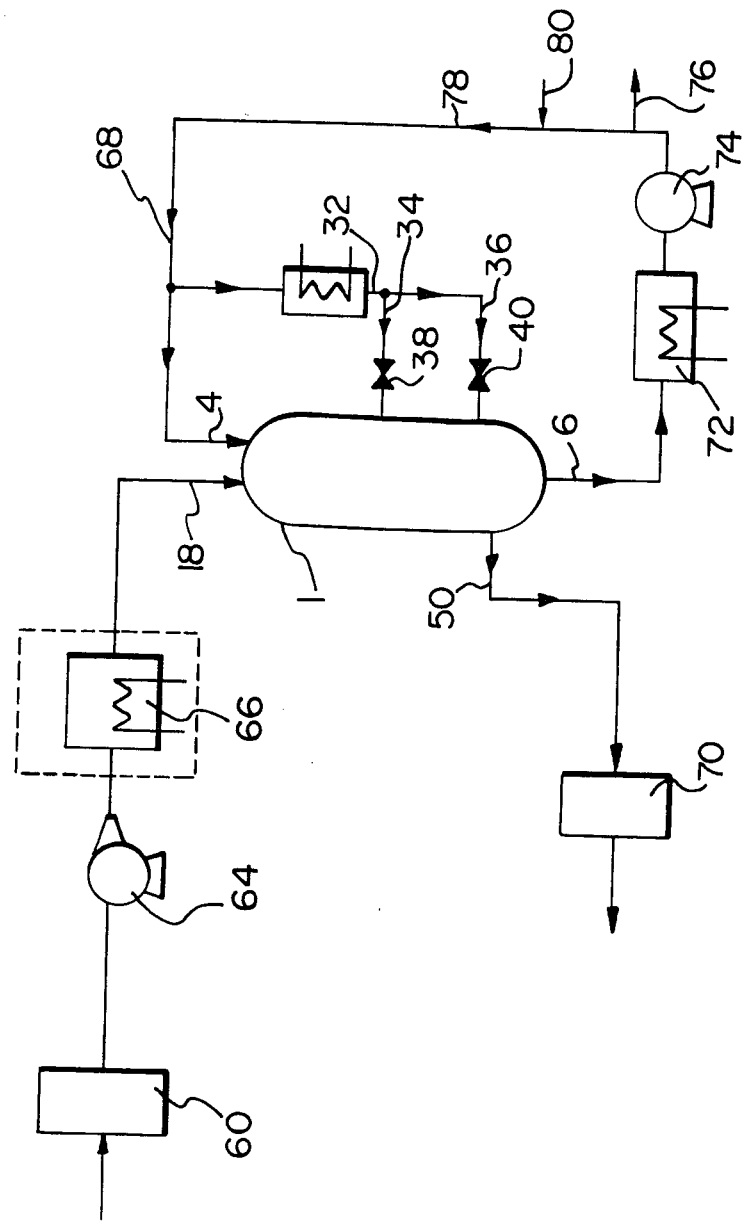

In the accompanying drawings, which illustrate, by way of example, an embodiment of the present invention, FIG. 1 is a diagrammatic view, with parts cut away, of a sulphuric acid, from sulphur dioxide, producing apparatus, and FIG. 2 is a flow diagram of the apparatus shown in FIG. 1 used for the removal of sulphur dioxide from flue gas.

In FIG. 1 there is shown a sulphuric acid, from sulphur dioxide, producing apparatus, comprising:

(a) a casing 1 having inlet means designated 2 for fluid streams in the form of gaseous sulphur dioxide and oxygen, and designated 4 for liquid primary sulphuric acid and water, and outlet means in the form of pipes 6 for sulphuric acid, (b) a catalyst assembly, generally designated 8, in an intermediate portion 10 of the casing for receiving the fluid streams from the inlet means 2 and 4, at a process temperature in the range of 150° to 280°, and catalytically combining the gaseous sulphur dioxide and oxygen into, and delivering sulphuric acid to the outlet means 6, the catalyst assembly 8 comprising at least one high surface area, non-combustible, sulphuric acid resistant catalyst support, such as support 12, and an outer, porous membrane coating on the said at least one support 12 and consisting of a process temperature and sulphuric acid resistant, water repellent, gaseous sulphur dioxide and oxygen gas permeable, high molecular weight, organic, polymeric material and crystallites of at least one catalytically active metal selected form Group VIII of the Periodic Table, with the crystallites dispersed in the polymeric material.

The casing 1 has an upper, fluid streams receiving section 14 above the catalyst assembly 8, and a lower sulphuric acid collecting section 16 beneath the catalyst assembly 8.

The inlet means 2, for gaseous sulphur dioxide and oxygen, comprises a pipe 18 having a coiled end 20 in the shape of a plane spiral and nozzles 22.

The inlet means 4, for liquid primary sulphuric acid and water, comprises a pipe 24 having a coiled end 26 in the shape of a plane spiral and nozzles 28. The nozzles 28 are above the nozzles 22 so that liquid from nozzles 28 will entrain gas from nozzles 22 and carry it downwardly through the catalyst assembly 8.

Sulphuric acid inlet means, generally designated 30, is provided for distributing additional primary sulphuric acid and water across intermediate levels of the catalyst assembly 8. The inlet means 30 comprises a pipe 32 having one or more branches, in this instance branches 34 and 36 fitted with valves 38 and 40, respectively, and with plane spiral coiled ends 42 and 44, respectively. The coiled ends 42 and 44 are provided with nozzles 46 and 48, respectively.

An outlet pipe 50 for oxygen containing a low concentration of sulphur dioxide is provided from the sulphuric acid collecting section 16 at a level above the maximum sulphuric acid level 52.

In this embodiment, the catalyst assembly 8 includes at least one catalytically inert packing structure 54 interspersed with the said at least one catalyst support 12. The said at least one catalytically inert packing structure 54 having an exterior which is substantially hydrophilic.

In operation, with the apparatus arranged as shown in FIG. 1, gaseous sulphur dioxide and oxygen are fed into the casing 1 through the inlet means 2 and liquid primary sulphuric acid and water are fed into the casing 1 through the inlet means 4 and the inlet means 30, while sulphuric acid is drained from the casing through the pipe 6 and oxygen low in SO$_2$ is taken from the casing 1 by means of outlet pipe 50.

Thus, in operation, sulphuric acid is produced from sulphur dioxide by:

(a) simultaneously contacting fluid streams in the form of gaseous sulphur dioxide and oxygen from inlet means 2 and liquid primary sulphuric acid and water from inlet means 4, and the catalyst assembly 8 which is in the path of the contacting fluids, with the input temperature of the gaseous sulphur dioxide and oxygen adjusted, by means now shown, so that the said fluid and said catalyst assembly are contacted at a process temperature in the range 150° to 280° C., so that, (i) gaseous sulphur dioxide and oxygen are catalytically combined to form sulphur trioxide,
 (ii) exothermic heat generated in the catalyst packed bed assembly by the formation of sulphur trioxide is dissipated by sulphuric acid and water,
 (iii) the sulphur trioxide and the water combined to form secondary sulphuric acid, and
 (iv) the primary sulphuric acid combines with the secondary sulphuric acid to form a relatively more concentrated sulphuric acid solution therewith, and then (b) collecting the more concentrated sulphuric acid solution issuing from pipe 6.

The gaseous sulphur dioxide is catalytically oxidized, with the gaseous oxygen, in the catalyst assembly 8 into sulphur trioxide ($SO_3$) and then the $SO_3$ combines with the liquid water fed with the primary sulphuric acid to form further sulphuric acid therewith. Thus, a more concentrated sulphuric acid exits by pipe 6, from the casing 1 than is fed into the casing 1 by the inlet means 2.

The catalyst assembly 8 may be in the form of Pt (or other metal) deposited on supports 12 of, for instance, ceramic or alumina-silicate (e.g. zeolite), wetproofed with a polytetrafluoroethylene porous membrane coating. The coating ensures that no liquid contact is made with the catalyst metal. The catalyst support is acid resistant to reduce attack by product $SO_3$.

The process operates at an operating temperature in the range 150° to 280° C. to maintain liquid $H_2SO_4$ throughout the catalyst assembly 8, and so a catalyst with a low ignition temperature is used.

High acid concentrations, typical of existing sulphuric plants, (80–98%) are preferred for more efficient absorption of $SO_3$ and to reduce corrosion problems. Lower acid concentrations could be used if an operating temperature at the lower end of the range 150° to 280° C. is used, by using a catalyst with a lower ignition temperature. The sulphuric acid both absorbs $SO_3$ and removes exothermic heat from the catalyst assembly 8 and so the flowrate is determined by the need to keep the catalyst assembly 8 as close to isothermal condition as possible. To ensure that good liquid distribution is maintained across the catalyst assembly 8, the partial pressure of sulphuric acid vapour in any part of the catalyst assembly 8 preferably should not exceed 50% of the reactor pressure.

The sulphuric acid leaving the reactor may need to be cooled in an external heat exchanger (not shown) depending on the $SO_2$ concentration in the feed gas. When preheating of feed gases is necessary, the heat of reaction and absorption can be used via a process-process heat exchanger (not shown). Excess heat could be used as preheat for or to produce steam.

The catalyst assembly 8 may be the simple packed bed shown or for high concentrations of $SO_2$ where a large amount of heat would be evolved; catalyst assemblies could be packed into discrete tubes with individual, primary sulphuric acid and water supplies and cooling between the tubes.

Prepurification of the feed gas may be required to remove entrained particles therefrom but it is not necessary to dry the gas as the catalyst is designed to work in wet conditions.

The packing structures 54 may be of a ceramic, and, being hydrophilic, provide greater surface area contact between the $SO_3$ and the primary sulphuric acid and water so that this portion of the process wherein $SO_3$ is absorbed by the water of the primary sulphuric acid to form additional sulphuric acid does not impede the overall rate of the process.

The following experiments have been carried out to verify the present invention.

A $SO_2$-oxygen mixture containing 10–14% $SO_2$ was introduced into a catalyst bed of 2.5 cm diameter and 2.5 cm high at 270° C. and 101 kPa. The gas flow rate was 6.6 mL/s. An aqueous sulphuric solution containing 90% $H_2SO_4$ was simultaneously introduced into the catalyst bed. The gas chromatographic analysis of the effluent gas indicated that 5.0–7.0% of $SO_2$ had been converted and absorbed by the liquid $H_2SO_4$ solution. Each experimental run took about 40 min to ensure that steady state conditions had been reached. The results were found to be reproducible.

The catalyst was platinum crystallites supported on 1/16" pellets of zeolite having a surface area of 400 $m^2/g$. The pellets were then wetproofed with polytetrafluoroethylene.

In FIG. 2, similar parts to those shown in FIG. 1 are designated by the same reference numerals and the previous description is relied upon to describe them.

In FIG. 2, the apparatus shown in FIG. 1 is depicted in a flow diagram for removing $SO_2$ from flue gases containing $SO_2$.

Flue gases containing $SO_2$ and particulate material at a typical temperature in the range 140° to 230° C. and with a typical $SO_2$ concentration in the range 1,000 to 5,000 ppm are first passed with air through a particulate removal device 60, e.g. an electrostatic precipitator, for the removal of particulate material therefrom.

The flue gases and air are pumped by, for example, a blower 64 through a preheater 66 to bring the flue gases and air up to the desired process temperature. The heated flue gases and air then enter the casing 1 by the inlet pipe 18.

Sulphuric acid and water are fed to the casing 1 along the inlet pipes 4, 34 and 36, from a pipe 68 to produce the $SO_3$, and from it the sulphuric acid in the catalyst assembly 8 in the casing 1.

The air with a low concentration of $SO_2$ from the pipe 50 is passed through a condenser 70.

The more concentrated sulphuric acid from pipe 6 is first passed through a cooler 72, then a pump 74, and then a portion is removed along pipe 76 while the remainder is recirculated along pipe 78 to pipe 68. As the sulphuric acid passes along pipe 78, make up water is added by pipe 80 to provide the water necessary for further $SO_3$ to be converted to sulphuric acid in the catalyst assembly in the casing 1.

It will be noted that in the embodiment shown in FIG. 2 the oxygen is supplied as a constituent of an air supply.

In other embodiments of the present invention, the oxygen, which may or may not be supplied as a component of air, is supplied separately from the sulphur dioxide to the casing 1.

In yet other embodiments of the present invention, the water is supplied separately from the sulphuric acid to the casing 1.

In some embodiments of the present invention, the catalyst assembly 8 comprises an ordered packed bed composed of corrugated stainless steel wire mesh rolls coated each with polytetrafluoroethylene membrane having platinum crystallites on silica particles dispersed therein. The membrane coating is sulphuric acid and water repellent but gaseous sulphur dioxide and oxygen gas permeable. The corrugated stainless steel wire mesh roll is preferably corrugated at an angle in the range 30° to 45° to the axis of generation of the roll to achieve good mixing of the gases and liquids.

In other embodiments of the present invention, the catalyst assembly 8 comprises an ordered packed bed composed of corrugated polytetrafluoroethylene mesh rolls each coated with polytetrafluoroethylene membrane having platinum crystallites on silica particles dispersed therein.

We claim:

1. A method of producing sulphuric acid from sulphur dioxide, comprising:
   (a) simultaneously contacting fluid streams in the form of gaseous sulphur dioxide and oxygen and liquid, primary sulphuric acid and water, and a catalyst assembly in the path of the contacting fluids, said fluid and said catalyst assembly being contacted at a process temperature in the range 150° to 280° C., the catalyst assembly comprising at least one high surface area, non-combustible, sulphuric acid resistant, catalyst support and an outer, porous membrane coating on the said at least one support and consisting of a process temperature and sulphuric acid resistant gas permeable, water repellent, gaseous sulphur dioxide and oxygen gas permeable, high molecular weight, organic, polymeric material which is polytetrafluoroethylene and crystallites of at least one catalytically active metal selected from Group VIII of the Periodic Table, with the crystallites dispersed on the porous support in the polymeric material, so that:
      (i) gaseous sulphur dioxide and oxygen are catalytically combined to form sulphur trioxide,
      (ii) exothermic heat generated in the catalyst assembly by the formation of sulphur trioxide therein is dissipated by the sulphuric acid and water,
      (iii) the sulphur trioxide and the water combine to form secondary sulphuric acid, and
      (iv) the primary sulphuric acid combines with the secondary sulphuric acid to form a relatively more concentrated sulphuric acid solution therewith, and then
   (b) collecting the more concentrated sulphuric acid solution.

2. A method according to claim 1 wherein the gaseous oxygen is supplied as a constituent of an air supply.

3. A method according to claim 1 wherein the primary sulphuric acid is in solution with the water.

4. A method according to claim 1 wherein the catalyst assembly is an upwardly extending catalyst packed bed, the gaseous sulphur dioxide and oxygen are distributed over the catalyst packed bed, and the liquid, primary sulphuric acid and water are distributed over the catalyst packed bed at a position above the gaseous sulphur dioxide and oxygen in order to entrain them and convey them downwardly through the catalyst packed bed.

5. A method according to claim 1 wherein the said at least one catalyst support has a surface area in the range 50 to 250 $m^2/g$.

6. A method according to claim 1 wherein additional, primary sulphuric acid and water are distributed across the catalyst assembly at, at least one intermediate level thereof.

7. A method according to claim 1 wherein greater surface area contact between sulphur trioxide and primary sulphuric acid and water is provided by the catalyst assembly including at least one catalytically inert packing structure interspersed with the said at least one catalyst support, with said at least one catalytically inert packing structure having an exterior which is substantially hydrophilic.

* * * * *